P. G. GARDNER.
ANTISLIP BELT.
APPLICATION FILED MAR. 22, 1917.
1,255,525.
Patented Feb. 5, 1918.
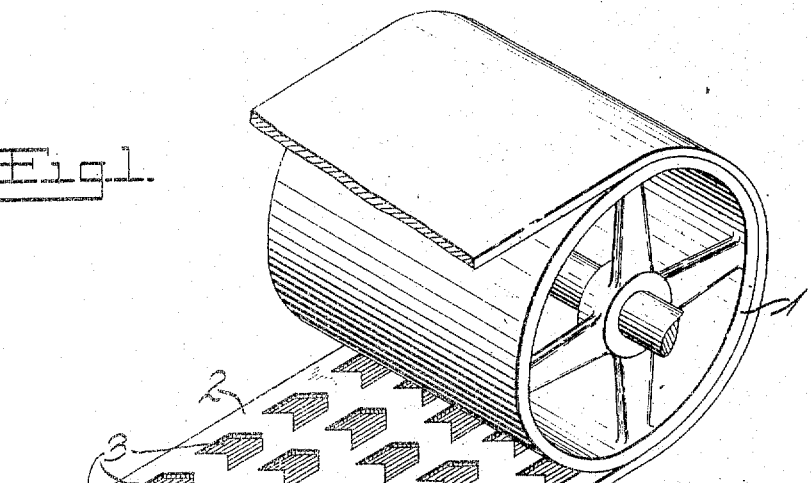
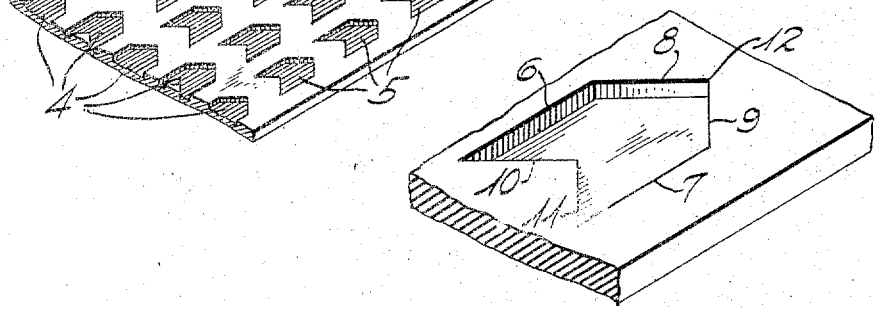
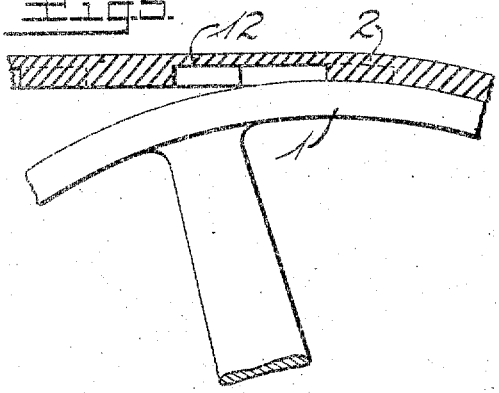
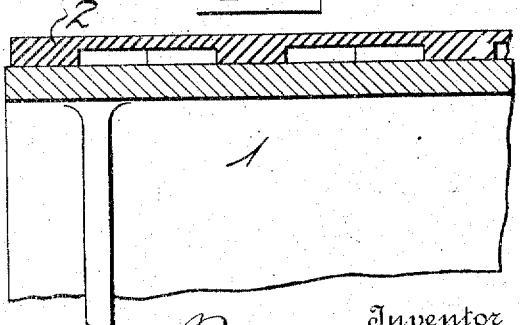
Inventor
Perry G. Gardner
By his Attorney
W. H. Parker

UNITED STATES PATENT OFFICE.

PERRY G. GARDNER, OF RUTHERFORD, NEW JERSEY; ASSIGNOR OF ONE-HALF TO BOUND BROOK OIL-LESS BEARING COMPANY, OF BOUNDBROOK, NEW JERSEY, A CORPORATION OF NEW JERSEY.

ANTISLIP-BELT.

1,255,525.

Specification of Letters Patent.

Patented Feb. 5, 1918.

Application filed March 23, 1917. Serial No. 156,723.

*To all whom it may concern:*

Be it known that I, PERRY G. GARDNER, a citizen of the United States, and a resident of Rutherford, in the county of Bergen and State of New Jersey, have invented certain new and useful Improvements in Antislip-Belts, of which the following is a specification.

The invention relates to an anti-slip belt; that is, a belt which will have greater traction with reference to its pulley than is possible in the ordinary arrangement of belt and pulley. It relates more specifically to a belt which is provided with suction or traction pockets or openings which will not only give increased adhesion between the belt and pulley but will provide for centralizing the belt with reference to the pulley while it is running.

The object of the invention is to provide a non-slipping belt which will maintain its position upon the pulley under all ordinary running conditions.

A further object is to provide a belt having suction or traction pockets throughout its width and length which will give greater adhesion of the belt with reference to the pulley and will cause the belt to centralize itself with reference to said pulley.

It is a further object to give a maximum traction effect or driving effect between the belt and pulley, without an increase in the driving power required to operate the belt, in transmitting its power from a driving to a driven pulley and respective shafts.

Referring to the drawings:

Figure 1 is a broken perspective view of the belt, showing its application to a pulley.

Fig. 2 is an enlarged fragmentary perspective view illustrating one of the pockets.

Fig. 3 illustrates in fragmentary form the belt and pulley as the suction cups are released on the tangential line of the pulley.

Fig. 4 is a cross sectional view in fragmentary form illustrating the belt and pulley, the section being taken through the suction pockets.

The difficulties arising from the slipping of belts, is too obvious to need particular comment or criticism. It is a well known fact that belts slip, scream and squeak as the driving pulley operates a driven pulley which is under unusual load. It is a well known fact that belts of ordinary type, either under the stress of initial driving torque or high speed operation, often run off the pulley. While many devices have been utilized for holding a belt centrally of the pulley, they have been more or less ineffective inasmuch as they wear the edges of the belt.

It is one of the principal objects of the present invention to provide a belt having inherent qualities of adhesion and similar inherent characteristics of centralization. The belt may be made in any desired form, either "plied up" with laminæ of material or in the ordinary solid leather form. In any event, it is provided with traction or suction cups of a peculiar and unique form which provide increased driving facilities without slip and also operate to centralize the belt, keeping it in proper running position upon the pulley.

Referring to the drawings, the numeral 1, denotes a pulley which may be of any desired type or form. 2, indicates the belt.

The belt is provided with a series of suction cups 3, which, by preference, are arranged transversely across the belt and longitudinally thereof. As illustrated in the drawings, there are five series of suction cups, the lines being indicated at 4. These extend longitudinally of the belt throughout its length. The drawings also illustrate the suction cups 3, arranged in transverse rows as at 5. Of course, it is obvious that the various rows of each series of the cups may be arranged in any desired number and manner, it only being important that they come into action upon the pulley on tangential lines and are relieved as they pass over the pulley on tangential lines so that the suction action is created during the immediate contact of the belt with the pulley, the suction cups being released at the point where the driving belt ceases to contact with the pulley.

The cups are best illustrated in Fig. 2 of the drawings. It will be observed that each cup has parallel side walls 6, 7, and end walls 8, 9, 10, 11, the wall 8, being parallel to the wall 10, and the wall 9, being parallel to the wall 11.

The walls 8 and 9, are obliquely disposed with reference to the walls 6 and 7, and extend forward and beyond said walls 6 and 7. The walls 10, 11, are likewise obliquely disposed with reference to the walls 6 and 7, and are respectively parallel to the walls 8 and 9. These walls 10, 11, project inward between the side walls 6 and 7, thus giving a pocket of peculiar form.

The object and purpose of the pockets is to create a suction effect which gives adhesion to the belt with reference to the pulley as the pocket reaches a full contact therewith. The pockets are also designed with the advance points to the oblique walls 8 and 9, and the walls 10 and 11, so that the suction will be broken gradually but thoroughly as the belt passes away from the pulley. This arrangement gives a smooth, firm action between the running belt and pulley, and yet provides for easier release of the belt after it has performed its driving function.

It will be observed that in arranging the suction pockets all of the walls 6, 7, are parallel in the adjacent series of pockets, and these walls lie in the elemental longitudinal lines of the belt.

It will also be observed that the end walls of the pockets in the various series are all in parallelism and, being oblique to the side walls, tend to guide the belt along the elemental lines defined by the side walls so that there is practically no side slippage of the belt with reference to the pulley.

As illustrated, the various series of pockets are arranged in longitudinal rows or series and in transverse rows or series, and to clearly exemplify the invention, the transverse rows of pockets are all in parallel throughout the extended belt. Such an arrangement provides for the gripping action of the cups upon the pulley with each transverse line or row of cups coming in contact with the face of the pulley, and further provides for the ready release of each transverse line or row of cups at the point where the belt is free from the pulley. There is, therefore no overdrag of the belt with reference to the pulley inasmuch as when the suction cups are vented and released the adhesion to the pulley is broken. Thereupon, the belt acts as the ordinary solid belt.

It is quite obvious that the belt may be made in any desired form, either of uniform thickness of leather or webbing or may be "plied up." It is also apparent that the cups may be pressed into the face of a single piece or composition belting or may be formed through the laminæ of certain strata of a composite structure. In fact, the principal idea is to provide in the working face of the belt a series of suction cups which will, upon contact with the pulley, give immediate adhesion and, upon release of the belt from the pulley, break the suction, the cups being of a form which will centralize the belt with reference to the pulley.

In Fig. 3 the relief of the suction and release from the pulley is illustrated. In this view the point 12, has passed beyond the tangential point of contact and broken the suction of the cup with reference to the face of the pulley.

It is obvious that the exact form and arrangement of the cups might be modified to any desired degree without departing from the spirit or intent of the invention and that the cups may be formed in the belt in any desired manner. Of course, the illustration exaggerates the size, depth, etc., of the cups with reference to the belt, but actually the cups are so arranged that they do not materially weaken the belt structure.

What I claim as my invention and desire to secure by Letters Patent is:

1. A belt having a series of cups arranged transversely and longitudinally of the belt and upon its face, and adapted to have contact with a pulley whereby adhesion between the belt and pulley is increased.

2. A belt having traction cups arranged in parallel lines lengthwise of the belt and in parallel lines transversely thereof.

3. A belt having traction cups arranged longitudinally and transversely of said belt in a series of rows, said traction cups having parallel side walls extending longitudinally of the belt and end walls obliquely disposed with reference to the side walls.

4. A belt having traction cups, each of said cups having parallel side walls arranged longitudinally of the belt and provided with end walls obliquely disposed to the side walls, two of said end walls projecting beyond the side walls and two of said end walls projecting between the side walls.

5. A belt having suction cups arranged longitudinally and transversely thereof, each of said cups having substantially parallel side walls extending longitudinally of the belt and provided with end walls, one end wall projecting beyond the limits of the side walls and the other end wall projecting between the said side walls, the end walls being parallel with reference to each other.

6. A belt having suction cups arranged in the driving face of the belt, said cups having parallel side walls and angularly disposed end walls, the angularly disposed walls meeting centrally with reference to the side walls, the end walls at one end projecting beyond the side walls, the end walls at the opposite end projecting between the side walls.

PERRY G. GARDNER.

Witnesses:
 GEO. O. SMALLEY,
 E. LOWANDE.